(12) United States Patent
Eckel et al.

(10) Patent No.: US 8,349,927 B2
(45) Date of Patent: *Jan. 8, 2013

(54) SCRATCH-RESISTANT, IMPACT-RESISTANT POLYCARBONATE MOULDING COMPOSITIONS HAVING GOOD MECHANICAL PROPERTIES II

(75) Inventors: Thomas Eckel, Dormagen (DE); Vera Taschner, Köln (DE); Achim Feldermann, Düsseldorf (DE); Burkhard Thuermer, Bornheim (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,083

(22) Filed: Dec. 16, 2010

(65) Prior Publication Data

US 2011/0152418 A1    Jun. 23, 2011

(30) Foreign Application Priority Data

Dec. 18, 2009 (DE) .................... 10 2009 059 074

(51) Int. Cl.
*C08G 18/77* (2006.01)
(52) U.S. Cl. ........................ 524/115; 524/127
(58) Field of Classification Search ............ 524/115
See application file for complete search history.

(56) References Cited

U.S. PATENT DOCUMENTS

| 6,664,313 | B2 | 12/2003 | Hirai et al. | |
|---|---|---|---|---|
| 7,250,127 | B2 * | 7/2007 | Geck et al. | 264/142 |
| 2007/0282045 | A1 | 12/2007 | Volkers | |
| 2008/0103267 | A1 | 5/2008 | Hurst et al. | |
| 2008/0132618 | A1 * | 6/2008 | Eckel et al. | 524/127 |
| 2009/0111943 | A1 | 4/2009 | Bhat et al. | |

FOREIGN PATENT DOCUMENTS

| EP | 0 391 413 | 10/1990 |
|---|---|---|
| EP | 0752448 A2 | 1/1997 |
| JP | 1-104637 | 4/1989 |
| JP | 2-87478 | 3/1990 |
| JP | 05 70653 | 3/1993 |
| JP | 2003-326623 | 11/2003 |

OTHER PUBLICATIONS

Notification of Transmittal of the International Search Report and the Written Opinion of the International Searching Authority issued Mar. 22, 2011 in corresponding International Application No. PCT/EP2010/069833.

* cited by examiner

*Primary Examiner* — Doris Lee
(74) *Attorney, Agent, or Firm* — Baker Donelson Bearman Caldwell & Berkowitz

(57) ABSTRACT

The present invention relates to scratch-resistant, impact-resistant polycarbonate (PC) compositions and molding compositions which have good mechanical properties as well as high resistance to chemicals, to a process for their preparation, and to their use in the production of molded articles, in particular of casings for flat screen devices.

17 Claims, No Drawings

SCRATCH-RESISTANT, IMPACT-RESISTANT POLYCARBONATE MOULDING COMPOSITIONS HAVING GOOD MECHANICAL PROPERTIES II

CROSS REFERENCE TO RELATED APPLICATIONS

This application claims priority to Germany Application 10 2009 059 074.9 filed Dec. 18, 2009, the content of which is incorporated herein by reference in its entirety.

BACKGROUND OF THE INVENTION

1. Field of the Invention

The present invention relates to scratch-resistant, impact-resistant polycarbonate (PC) compositions and moulding compositions which have good mechanical properties as well as high resistance to chemicals, to a process for their preparation, and to their use in the production of moulded articles, in particular of casings for flat screen devices.

2. Description of Related Art

JP-A 05-070653 describes hollow glass spheres having high compressive strength as an additive in maleimide-modified ABS moulding compositions. The moulding compositions have a reduced density, a high flexural modulus and good heat distortion resistance. Advantageous effects on joint line strength, resistance to chemicals or increased scratch resistance are not reported.

EP-A 391 413 describes the use of talc as a filler in impact-modified polycarbonate. An influence on the scratch resistance or processing behaviour is not described. Positive effects of this additive on notched impact strength or joint line strength are not described.

JP-A 01-104637 describes mixtures of crystalline polypropylene and modified polypropylene, to which hollow particles of Al2O3-SiO2 have been added. Compared with a corresponding mixture with talc, improved scratch resistance with a reduced flexural modulus was obtained by means of these particles. Effects on the joint line strength or the resistance to chemicals by the addition of the aluminosilicate particles are not described.

JP 2003-326623 describes multi-layer sheets of polycarbonate in which an intermediate layer for insulation against heat and sound is provided with hollow ceramics spheres. However, the spheres are not present in a blend with polycarbonate and other polymers such as, for example, ABS.

EP 2087478 A1 describes impact-modified filled polycarbonate compositions having increased demands in terms of mechanical properties and improved flow behaviour, which compositions are obtained by addition of hollow ceramics spheres. An influence of these additives on the impact strength and/or joint line strength is not described, however.

US 20080103267A1 describes mixtures of polycarbonate, small amounts of an SAN copolymer and specific polyorganosiloxane/silica preparations for transparent moulding compositions. However, these compositions do not contain impact modifiers, for which reason the impact strength and joint line strength of these compositions are inadequate.

SUMMARY OF THE INVENTION

It is an object of the present invention to provide a moulding composition which is distinguished by a combination of properties of very good mechanical properties when rapidly subjected to an impact, such as high notched impact strength, as well as by good resistance to chemicals (ESC behaviour) and heat distortion resistance while having consistently high scratch resistance. The moulding compositions should preferably be flame-resistant and satisfy the requirements of UL94 with V-0 even in the case of very thin wall thicknesses (i.e. wall thickness of even as small as approximately 1.5 mm or less).

The invention also provides processes for the preparation of the moulding compositions, and the use of the moulding compositions in the production of moulded articles.

The moulding compositions according to the invention can be used for example, in the production of moulded articles of any kind. The moulded articles can be produced by injection moulding, extrusion and blow moulding processes. A further form of processing is the production of moulded articles by deep-drawing from previously produced sheets or films.

Examples of such moulded articles include films, profiles, casing parts of any kind, for example for domestic appliances such as juice extractors, coffee makers, mixers; for office equipment such as monitors, flat screens, notebooks, printers, copiers; sheets, tubes, conduits for electrical installations, windows, doors and further profiles for the construction sector (interior fitting and external applications) as well as parts for electronics and electrical engineering, such as switches, plugs and sockets, as well as bodywork and interior components for commercial vehicles, in particular for the automotive sector.

In particular, the moulding compositions according to the invention can also be used, for example, in the production of the following moulded articles or mouldings: Parts for the interior finishing of railway vehicles, ships, aircraft, buses and other motor vehicles, casings for electrical devices containing small transformers, casings for devices for processing and transmitting information, casings and coverings for medical devices, massage devices and casings therefore, toy vehicles for children, prefabricated wall panels, casings for security devices, heat-insulated transport containers, mouldings for sanitary and bathroom fittings, cover grids for ventilator openings, and casings for garden equipment.

It has been found, surprisingly, that the desired property profile is exhibited by compositions comprising A) from 10 to 90 parts by weight, preferably from 50 to 85 parts by weight, particularly preferably from 60 to 75 parts by weight, aromatic polycarbonate and/or aromatic polyester carbonate, B) from 0.5 to 30.0 parts by weight, preferably from 1.0 to 25.0 parts by weight, more preferably from 2.0 to 20.0 parts by weight, particularly preferably from 4.0 to 9.0 parts by weight, rubber-modified graft polymer, C) from 0 to 40.0 parts by weight, preferably from 1.0 to 30.0 parts by weight, particularly preferably from 1.5 to 10.0 parts by weight, vinyl (co)polymer (C.1) and/or polyalkylene terephthalate (C.2), D) from 0.1 to 10.0 parts by weight, preferably from 0.3 to 8.0 parts by weight, more preferably from 0.5 to 6.0 parts by weight, yet more preferably from 1.0 to 6.0 parts by weight, and particularly preferably from 2.0 to 5.0 parts by weight, polyorganosiloxane/silica gel composition, E) from 0 to 20.0 parts by weight, preferably from 1.0 to 15.0 parts by weight, and particularly preferably from 3.0 to 12.0 parts by weight, of an inorganic compound having a Mohs hardness of at least 2.5, F) from 0 to 20.0 parts by weight, preferably from 1.0 to 18.0 parts by weight, more preferably from 2.0 to 16.0 parts by weight, particularly preferably from 3.0 to 15.0 parts by weight, of at least one phosphorus-containing flameproofing agent, G) from 0 to 10.0 parts by weight, preferably from 0.5 to 8.0 parts by weight, particularly preferably from 1.0 to 6.0 parts by weight, additives, all parts by weight in the present application being so normalised that the sum of the parts by weight of all the components A+B+C+D+E+F+G in the composition is 100.

DETAILED DESCRIPTION OF A PREFERRED EMBODIMENT

In a preferred embodiment, the inorganic compound of component E is selected from the group of the silicates, aluminosilicates, carbides, nitrides and metal oxides, in particular boron nitride, silicon carbide, tungsten carbide, boron carbide, cerium oxide, kaolin and aluminium oxide (corundum).

In a particular embodiment, the inorganic compounds, in particular aluminosilicates, are present in the form of hollow spheres.

Component A

Aromatic polycarbonates and/or aromatic polyester carbonates according to component A that are suitable according to the invention are known in the literature or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 007 934).

The preparation of aromatic polycarbonates is carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates are preferably those of formula (I)

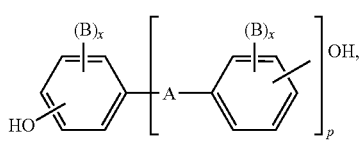

(I)

wherein
A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which further aromatic rings optionally containing heteroatoms can be fused, or a radical of formula (II) or (III)

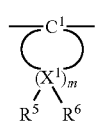

(II)

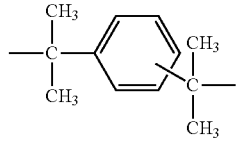

(III)

B is in each case $C_1$- to $C_{12}$-alkyl, preferably methyl, halogen, preferably chlorine and/or bromine,
x each independently of the other is 0, 1 or 2,
p is 1 or 0, and $R^5$ and $R^6$ can be chosen individually for each $X^1$ and each independently of the other is hydrogen or $C_1$- to $C_6$-alkyl, preferably hydrogen, methyl or ethyl,
$X^1$ is carbon and
m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetrabrominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be used on their own or in the form of arbitrary mixtures. The diphenols are known in the literature or are obtainable according to processes known in the literature.

Chain terminators suitable for the preparation of thermoplastic aromatic polycarbonates are, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates have mean molecular weights (weight-average $M_w$, measured by GPC (gel permeation chromatography) with polycarbonate standard) of from 10,000 to 200,000 g/mol, preferably from 15,000 to 80,000 g/mol, particularly preferably from 24,000 to 32,000 g/mol.

In a preferred embodiment, component A is a mixture of a linear polycarbonate A1 based on bisphenol A having a weight-average molecular weight $\overline{M}_w$ of 27,500 g/mol (determined by GPC in dichloromethane with polycarbonate standard) and of a linear polycarbonate A2 based on bisphenol A having a weight-average molecular weight $\overline{M}_w$ of 19,500 g/mol (determined by GPC in dichloromethane with polycarbonate standard).

More preferably, the ratio of A1:A2 is from 1:3 to 3:1, particularly preferably from 1.0:1.5 to 1.5:1.0.

The thermoplastic aromatic polycarbonates can be branched in a known manner, preferably by the incorporation of from 0.05 to 2.0 mol %, based on the sum of the diphenols used, of compounds having a functionality of three or more than three, for example those having three or more phenolic groups. Preference is given to the use of linear polycarbonates, more preferably based on bisphenol A.

Both homopolycarbonates and copolycarbonates are suitable. For the preparation of copolycarbonates of component A according to the invention it is also possible to use from 1 to 25 wt. %, preferably from 2.5 to 25 wt. %, based on the total amount of diphenols to be used, of polydiorganosiloxanes having hydroxyaryloxy end groups. These are known (U.S. Pat. No. 3,419,634) and can be prepared according to processes known in the literature. Also suitable are copolycarbonates containing polydiorganosiloxanes; the preparation of copolycarbonates containing polydiorganosiloxanes is described, for example, in DE-A 3 334 782.

Preferred polycarbonates in addition to the bisphenol A homopolycarbonates are the copolycarbonates of bisphenol A with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, is additionally used concomitantly as bifunctional acid derivative.

Suitable chain terminators for the preparation of the aromatic polyester carbonates, in addition to the monophenols already mentioned, are also the chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is in each case from 0.1 to 10 mol %, based in the case of phenolic chain terminators on moles of diphenol and in the case of monocarboxylic acid chloride chain terminators on moles of dicarboxylic acid dichloride.

One or more aromatic hydroxycarboxylic acids can additionally be used in the preparation of aromatic polyester carbonates.

The aromatic polyester carbonates can be both linear and branched in known manner (see in this connection DE-A 2 940 024 and DE-A 3 007 934), linear polyester carbonates being preferred.

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The thermoplastic aromatic polycarbonates and polyester carbonates can be used on their own or in an arbitrary mixture.

Component B

Component B comprises one or more graft polymers of

B.1 from 5 to 95 wt. %, preferably from 20 to 90 wt. %, particularly preferably from 30 to 60 wt. %, of at least one vinyl monomer on B.2 from 95 to 5 wt. %, preferably from 80 to 10 wt. %, particularly preferably from 70 to 40 wt. %, of one or more graft bases having glass transition temperatures <10° C., preferably <0° C., particularly preferably <−20° C.

The graft base B.2 generally has a mean particle size (d50 value) of from 0.05 to 10.00 µm, preferably from 0.10 to 5.00 µm, more preferably from 0.20 to 1.00 µm, and particularly preferably from 0.25 to 0.50 µm.

Monomers B.1 are preferably mixtures of

B.1.1 from 50 to 99 parts by weight vinyl aromatic compounds and/or vinyl aromatic compounds substituted on the ring (such as styrene, α-methylstyrene, p-methylstyrene, p-chlorostyrene) and/or (meth)acrylic acid ($C_1$-$C_8$)-alkyl esters (such as methyl methacrylate, ethyl methacrylate) and B.1.2 from 1 to 50 parts by weight vinyl cyanides (unsaturated nitriles such as acrylonitrile and methacrylonitrile) and/or (meth)acrylic acid ($C_1$-$C_8$)-alkyl esters, such as methyl methacrylate, n-butyl acrylate, tert-butyl acrylate, and/or derivatives (such as anhydrides and imides) of unsaturated carboxylic acids, for example maleic anhydride.

Preferred monomers B.1.1 are selected from at least one of the monomers styrene, α-methylstyrene and methyl methacrylate; preferred monomers B.1.2 are selected from at least one of the monomers acrylonitrile, maleic anhydride and methyl methacrylate. Particularly preferred monomers are B.1.1 styrene and B.1.2 acrylonitrile.

Graft bases B.2 suitable for the graft polymers B are, for example, diene rubbers, EP(D)M rubbers, that is to say those based on ethylene/propylene and optionally diene, acrylate, polyurethane, silicone, chloroprene and ethylene/vinyl acetate rubbers.

Preferred graft bases B.2 are diene rubbers, for example based on butadiene and isoprene, or mixtures of diene rubbers or copolymers of diene rubbers or mixtures thereof with further copolymerisable monomers (e.g. according to B.1.1 and B.1.2), with the proviso that the glass transition temperature of component B.2 is <10° C., preferably <0° C., particularly preferably <−10° C. Pure polybutadiene rubber is particularly preferred. The glass transition temperature is determined by means of dynamic differential calorimetry (DSC) according to DIN EN 61006 with a rate of heating of 10 K/min with determination of the $T_g$ as a midpoint determination (tangent method).

Particularly preferred polymers B are, for example, ABS polymers (emulsion, mass and suspension ABS), as are described, for example, in DE-OS 2 035 390 (=U.S. Pat. No. 3,644,574) or in DE-OS 2 248 242 (=GB-PS 1 409 275) or in Ullmanns, Enzyklopädie der Technischen Chemie, Vol. 19 (1980), p. 280 ff. The gel content of the graft base B.2 is preferably at least 30 wt. %, preferably at least 40 wt. % (measured in toluene).

The graft copolymers B are prepared by radical polymerisation, for example by emulsion, suspension, solution or mass polymerisation, preferably by emulsion or mass polymerisation.

Particularly suitable graft rubbers are also ABS polymers prepared by the emulsion polymerisation process by redox initiation with an initiator system comprising organic hydroperoxide and ascorbic acid according to U.S. Pat. No. 4,937,285.

Because it is known that the graft monomers are not necessarily grafted onto the graft base completely during the graft reaction, graft polymers B according to the invention are also understood as being those products which are obtained by (co)polymerisation of the graft monomers in the presence of the graft base and which are formed concomitantly during working up.

Suitable acrylate rubbers according to B.2 of the polymers B are preferably polymers of acrylic acid alkyl esters, optionally with up to 40 wt. %, based on B.2, of other polymerisable, ethylenically unsaturated monomers. The preferred polymerisable acrylic acid esters include $C_1$- to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, as well as mixtures of these monomers.

For crosslinking, monomers with more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; but also triallyl phosphate and diallyl phthalate. Preferred crosslinking monomers are allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of crosslinking monomers is preferably from 0.02 to 5.00 wt. %, in particular from 0.05 to 2.00 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerisable, ethylenically unsaturated monomers which can optionally be used in addition to the acrylic acid esters for preparing the graft base B.2 are, for example, acrylonitrile, styrene, α-methylstyrene, acrylamides, vinyl $C_1$-$C_6$-alkyl ethers, methyl methacrylate, butadiene. Preferred acrylate rubbers as the graft base B.2 are emulsion polymers which have a gel content of at least 60 wt. %.

Further suitable graft bases according to B.2 are silicone rubbers having graft-active sites, as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I and II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid, Z. and Z. Polymere 250 (1972), 782-1796).

Component C

Component C preferably comprises one or more thermoplastic vinyl (co)polymers C.1 and/or polyalkylene terephthalates C.2.

Suitable vinyl (co)polymers C.1 are polymers of at least one monomer from the group of the vinyl aromatic compounds, vinyl cyanides (unsaturated nitriles), (meth)acrylic acid ($C_1$-$C_8$)-alkyl esters, unsaturated carboxylic acids and derivatives (such as anhydrides and imides) of unsaturated carboxylic acids. Particularly suitable are (co)polymers of C.1.1 from 50 to 99 parts by weight, preferably from 60 to 80 parts by weight, vinyl aromatic compounds and/or vinyl aromatic compounds substituted on the ring (such as styrene, α-methylstyrene, p-methylstyrene, p-chlorostyrene) and/or (meth)acrylic acid ($C_1$-$C_8$)-alkyl esters (such as methyl methacrylate, ethyl methacrylate), and C.1.2 from 1 to 50 parts by weight, preferably from 20 to 40 parts by weight, vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate, tert.-butyl acrylate, and/or unsaturated carboxylic acids, such as maleic acid, and/or derivatives, such as anhydrides and imides, of unsaturated carboxylic acids (for example maleic anhydride and N-phenylmaleimide).

The vinyl (co)polymers C.1 are resin-like, thermoplastic and rubber-free. Particular preference is given to the copolymer of C.1.1 styrene and C.1.2 acrylonitrile.

The (co)polymers according to C.1 are known and can be prepared by radical polymerisation, in particular by emulsion, suspension, solution or mass polymerisation. The (co)polymers preferably have mean molecular weights Mw (weight-average, determined by light scattering or sedimentation) of from 15,000 to 200,000 g/mol, particularly preferably from 100,000 to 150,000 g/mol.

In a particularly preferred embodiment, C.1 is a copolymer of 77 wt. % styrene and 23 wt. % acrylonitrile having a weight-average molecular weight Mw of 130,000 g/mol.

The polyalkylene terephthalates of component C.2 are reaction products of aromatic dicarboxylic acids or their reactive derivatives, such as dimethyl esters or anhydrides, and aliphatic, cycloaliphatic or araliphatic diols, as well as mixtures of such reaction products.

Preferred polyalkylene terephthalates contain at least 80 wt. %, preferably at least 90 wt. %, based on the dicarboxylic acid component, terephthalic acid radicals and at least 80 wt. %, preferably at least 90 mol %, based on the diol component, ethylene glycol and/or 1,4-butanediol radicals.

As well as containing terephthalic acid radicals, the preferred polyalkylene terephthalates can contain up to 20 mol %, preferably up to 10 mol %, of radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

As well as containing ethylene glycol or 1,4-butanediol radicals, the preferred polyalkylene terephthalates can contain up to 20 mol %, preferably up to 10 mol %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,6-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of tri- or tetra-hydric alcohols or tri- or tetra-basic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particular preference is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Mixtures of polyalkylene terephthalates contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, Volume VIII, p. 695 ff, Carl-Hanser-Verlag, Munich 1973).

Component D

Component D according to the invention is an organopolysiloxane granulate comprising (D.1) at least one polyorganosiloxane comprising units of the general formula (IV):

$$R_rSiO_{(4-r)/2} \quad (IV)$$

wherein R each independently of any other(s) represents substituted or unsubstituted hydrocarbon radicals and r represents 0, 1, 2 or 3, with the proviso that the average numerical value of r is within a range of from 1.9 to 2.1, (D.2) from 1 to 200 parts by weight, based on 100 parts by weight of the polyorganosiloxane (D.1), of a reinforcing or non-reinforcing filler or of a mixture of reinforcing or non-reinforcing fillers, and (D.3) optionally from 0 to 20 parts by weight, based on 100 parts by weight of the polyorganosiloxane (D.1), of at least one additive for preparing a granulate, and (D.4) optionally further auxiliary substances selected from the group containing processing aids, plasticizers, pigments and stabilizers.

Preferred radicals R are, for example, alkyl, aryl, alkylaryl, alkenyl or cycloalkyl groups, which in each case can be substituted or unsubstituted as well as optionally interrupted by hetero atoms.

Examples of hydrocarbon radicals R are alkyl radicals, such as, for example, the methyl, ethyl, n-propyl, isopropyl, n-butyl, isobutyl, tert-butyl, n-pentyl, isopentyl, neopentyl, tert-pentyl radical, hexyl radicals, such as, for example, the n-hexyl radical, heptyl radicals, such as, for example, the n-heptyl radical, octyl radicals, such as the n-octyl radical and isooctyl radicals, such as, for example, the 2,2,4-trimethylpentyl radical or the ethylhexyl radical, nonyl radicals, such as, for example, the n-nonyl radical, decyl radicals, such as, for example, the n-decyl radical, dodecyl radicals, such as, for example, the n-dodecyl radical, octadecyl radicals, such as, for example, the n-octadecyl radical; cycloalkyl radicals, such as, for example, cyclopentyl, cyclohexyl, cycloheptyl radicals and methylcyclohexyl radicals; aryl radicals, such as, for example, the phenyl, biphenyl, naphthyl and anthryl and phenanthryl radical; alkaryl radicals, such as, for example o-, m-, p-tolyl radicals, xylyl radicals and ethylphenyl radicals; aralkyl radicals, such as, for example, the benzyl radical, the α- and β-phenylethyl radical.

Examples of substituted hydrocarbon radicals R are halogenated alkyl radicals, such as, for example, the 3-chloropropyl, 3,3,3-trichloropropyl and perfluorohexylethyl radical, halogenated aryl radicals, such as, for example, the p-chlorophenyl and p-chlorobenzyl radical.

The radical R is preferably hydrogen and/or hydrocarbon radicals having from 1 to 8 carbon atoms, particularly preferably methyl.

Further preferred examples of radicals R are the vinyl, allyl, methallyl, 1-propenyl, 1-butenyl, 1-pentenyl radical, the 5-hexenyl, butadienyl, hexadienyl, cyclopentenyl, cyclopentadienyl, cyclohexenyl, ethynyl, propargyl and 1-propynyl radical.

In a further preferred embodiment according to the invention, the radical R is alkenyl radicals having from 2 to 8 carbon atoms, particularly preferably the vinyl radical.

In the case of optionally substituted hydrocarbon radicals having from 1 to 8 carbon atoms, particularly preferred substituents are the methyl, vinyl, phenyl and 3,3,3-trifluoropropyl radical.

Preferably, alkyl radicals, in particular methyl radicals, are bonded to at least 70 mol % of the Si atoms present in the polyorganosiloxane D.1 comprising units of formula (IV).

If, as well as containing methyl or 3,3,3-trifluoropropyl radicals, as well as a combination of both, bonded to silicon, the polyorganosiloxanes also contain vinyl or phenyl radicals, as well as a combination of both, bonded to silicon, then the latter are preferably amounts of from 0.001 to 30 mol %.

The polyorganosiloxanes D.1 preferably consist predominantly of diorganosiloxane units. The end groups of the polyorganosiloxanes can be trialkylsiloxy groups, in particular the trimethylsiloxy radical or the dimethylvinylsiloxy radical;

however, one or more of these alkyl groups can also be replaced by hydroxy groups or alkoxy groups, such as methoxy or ethoxy radicals.

The polyorganosiloxanes (D.1) can be liquids or highly viscous substances. Preferably, the polyorganosiloxanes (D.1) have a mean molecular weight $M_n$ of from 200,000 g/mol to 800,000 g/mol, preferably from 300,000 g/mol to 700,000 g/mol, particularly preferably from 400,000 g/mol to 600,000 g/mol.

It is possible to use one polyorganosiloxane (D.1) or a mixture of at least two different polyorganosiloxanes (D.1).

For some applications, however, it can be advantageous to use crosslinkers, for example when bonding of the organopolysiloxane to the thermoplastic is desired. In this case, there are added to the polyorganosiloxane granulates according to the invention as crosslinkers preferably peroxides, such as dibenzoyl peroxide, bis(2,4-dichlorobenzoyl) peroxide, dicumyl peroxide, bis-4-methylbenzoyl peroxide, 2,5-dimethyl-hexane-2,5-di-tert-butyl peroxide or 2,5-bis-(tert-butylperoxy)-2,5-dimethylhexane and mixtures thereof.

The organopolysiloxane is preferably a linear organopolysiloxane, such as dimethylpolysiloxane, phenylmethylpolysiloxane, vinylmethylpolysiloxane and trifluoropropylpolysiloxane.

In a preferred form of the composition of the polyorganosiloxane granulates, the organopolysiloxane is present in amounts of preferably from 30 to 90 wt. %, particularly preferably from 40 to 80 wt. % and most particularly preferably from 60 to 70 wt. %.

The polyorganosiloxane granulates according to the invention further contain reinforcing and/or non-reinforcing fillers (D.2).

Examples of reinforcing fillers (D.2) are pyrogenic or precipitated silicas having BET surface areas of at least 50 m2/g (according to DIN 66131/2).

The mentioned silica fillers can be hydrophilic in nature or can be rendered hydrophobic by known processes. In this connection, reference is made, for example, to German Offenlegungsschrift DE 38 39 900 A1, the relevant disclosure of which is to form part of the present application and is incorporated herein by reference in its entirety. In general, hydrophobisation is carried out with from 1 to 20 wt. % hexamethyldisilazane or divinyltetramethyldisilazane or a mixture of the two, and from 0.5 to 5 wt. % water, in each case based on the total weight of the polyorganosiloxane (D.1), the reagents advantageously being added to the polyorganosiloxane (D.1) in a suitable mixing device, such as, for example, a kneader or intimate mixer, in which the polydiorganosiloxane (D.1) has already been placed, before the hydrophilic silica is gradually incorporated into the mixture.

Examples of non-reinforcing fillers (D.2) are quartz flour, diatomaceous earth, calcium silicate, zirconium silicate, zeolites, metal oxide powders, such as aluminium, titanium, iron or zinc oxide, barium silicate, barium sulfate, calcium carbonate, gypsum, polytetrafluoroethylene powder.

It is further possible to use fibrous components, such as glass fibres and plastics fibres, as reinforcing fillers. The BET surface area of such fillers is preferably below 50 m²/g (according to DIN 66131/2).

The organopolysiloxane granulates according to the invention contain filler (D.2) in amounts of preferably from 1 to 200 parts by weight, particularly preferably from 30 to 100 parts by weight, in each case based on 100 parts by weight of polyorganosiloxane (D.1).

The organopolysiloxane granulates according to the invention further optionally contain at least one additive (D.3) for the preparation of a granulate of organopolysiloxane. Suitable additives (D.3) are described in EP 1 028 140 A1, the relevant disclosure of which is to form part of this application, and which is incorporated herein by reference in its entirety.

The additive D.3 preferably contains

D.3.1. at least one polyorganosiloxane, the polyorganosiloxane preferably being a linear polyorganosiloxane, such as dimethylpolysiloxane, phenylmethylpolysiloxane, trifluoropropylpolysiloxane, ethylpropylpolysiloxane. The polyorganosiloxane D.3.1. has a viscosity of from 10,000 mPa·s to $9\times10^6$ mPa·s, preferably from 100,000 mPa·s to $8\times10^6$ mPa·s and particularly preferably from $6\times10^6$ mPa·s to $8\times10^6$ mPa·s.

The polyorganosiloxanes D.3.1. are present in the additive D.3 in amounts of preferably from 30 to 90 wt. %, particularly preferably from 40 to 80 wt. %, most particularly preferably from 60 to 70 wt. %.

D.3.2. boric acid, which is present in component D in amounts of preferably from 2 to 20 wt. %, particularly preferably from 3 to 14 wt. %, most particularly preferably from 8 to 9 wt. %.

D.3.3. fatty acid salts, the fatty acid salts preferably being the salts of the metals Al, Ba, Ca, Cd, Co, Cr, Cu, Fe, Li, Mg, Mn, Ni, Pb, Sn, Sr, Zn with higher (>12 carbon atoms) fatty, resin or naphthenic acids, such as stearates, palmitates, oleates, linoleates, resinates, laurates, octanoates, ricinoleates, 12-hydroxystearates, naphthenates, tallates and the like.

Preference is given to fatty acids having from more than 12 carbon atoms to 30 carbon atoms; particular preference is given to fatty acids having from more than 16 carbon atoms to 26 carbon atoms, with particular preference being given to the stearates, in particular calcium stearate.

The fatty acid salts are present in the composition in amounts of preferably from 1 to 10 wt. %, particularly preferably from 2 to 6 wt. %, most particularly preferably from 3 to 4 wt. %.

D.3.4. pyrogenic silicon dioxide, produced in the gas phase, having a surface area of from 150 to 300 g/m² or precipitated silica is optionally added in an amount of preferably from 8 to 60 wt. %, preferably from 15 to 50 wt. %, particularly preferably from 25 to 40 wt. %.

Component D.3 is present in the organopolysiloxane granulate preferably in amounts of from 0.1 to 4.0 wt. %, particularly preferably from 0.4 to 2.0 wt. %, most particularly preferably from 0.8 to 1.2 wt. %.

According to the particular application, additives (D.4), for example processing aids, such as, for example, plasticisers, pigments and stabilisers, such as, for example, heat stabilisers, can be added.

Examples of plasticisers which can be used as additives (D.4) are dipolyorganosiloxanes terminated with trimethylsiloxy groups or hydroxyl groups and having a viscosity of not more than 5000 mm²/s at 25° C., or alternatively diphenylsilanediol.

The dipolyorganosiloxanes are preferably composed of dimethylsiloxane units and/or vinylmethylsiloxane units.

Examples of heat stablisers which can be used as additives (D.4) are transition metal fatty acid salts, fatty, resin and naphthenic acids, such as stearates, palmitates, oleates, linoleates, resinates, laureates, octanoates, ricinoleates, 12-hydroxystearates, naphthenates, tallates and the like. Preference is given to fatty acids having from more than 12 carbon atoms to 30 carbon atoms; particular preference is given to fatty acids having from more than 16 carbon atoms to 26 carbon atoms, with particular preference being given to the stearates, in particular calcium stearate, such as iron or cerium octoate, titanium butylate, transition metal silanolates, such as iron silanolate, cerium(IV) compounds, carbon blacks, or metal oxides or metal oxide hydrates, such as, for example, iron or titanium oxide and mixtures thereof.

Component E

Component E according to the invention is at least one inorganic compound advantageously having a Mohs hardness of at least 2.5, selected from the group of the silicates, aluminosilicates, carbides, nitrides and metal oxides, in particular boron nitride, silicon carbide, tungsten carbide, boron carbide, cerium oxide, kaolin and aluminium oxide (corundum).

The moulding compositions according to the invention contain as component E preferably hollow ceramics spheres, particularly preferably hollow silicon-aluminium ceramics spheres.

Preferred hollow ceramics spheres have a content of $Al_2O_3$ of from 5 to 25 wt. %, preferably from 7.5 to 20.0 wt. % and particularly preferably from 10 to 15 wt. %.

In a preferred embodiment, the hollow ceramics spheres have a specific density of from 2.0 to 3.0 g/cm$^3$, preferably from 2.2 to 2.6 g/cm$^3$.
Particularly preferred hollow ceramics spheres have a compressive strength of from 50 to 700 MPa, preferably from 200 to 500 MPa.
The indicated compressive strength is the strength compared to an isostatic pressure at which 80% of the spheres are undamaged when they are exposed to the mentioned pressure in a liquid column.

The hollow ceramics spheres preferably have a mean particle diameter ($d_{50}$) of from 0.1 to 100.0 μm, preferably from 0.5 to 50.0 μm, more preferably from 1.0 to 30.0 μm, and particularly preferably from 2.0 to 10.0 μm. The average particle diameter ($d_{50}$ value) is determined by sedimentation in an aqueous medium using a Sedigraph 5100, Micrometrics Instruments Corporation, Norcross, Ga., USA.

Component F

Phosphorus-containing flameproofing agents F within the scope of the invention are preferably selected from the groups of the monomeric and oligomeric phosphoric and phosphonic acid esters, phosphonate amines and phosphazenes, it also being possible to use as flameproofing agents mixtures of several components selected from one or various of these groups. Other halogen-free phosphorus compounds not mentioned specifically here can also be used on their own or in any desired combination with other halogen-free phosphorus compounds.

Preferred monomeric and oligomeric phosphoric or phosphonic acid esters are phosphorus compounds of the general formula (V)

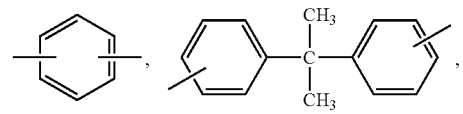

(V)

wherein
$R^1$, $R^2$, $R^3$ and $R^4$, independently of one another, represent in each case optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl, preferably $C_1$- to $C_4$-alkyl, and/or halogen, preferably chlorine, bromine,
each of the substituents n independently of the others represents 0 or 1,
q represents from 0 to 30 and X represents a mono- or poly-nuclear aromatic radical having from 6 to 30 carbon atoms, or a linear or branched aliphatic radical having from 2 to 30 carbon atoms which can be OH-substituted and can contain up to 8 ether bonds.

$R^1$, $R^2$, $R^3$ and $R^4$, independently of one another, preferably represent $C_1$- to $C_4$-alkyl, phenyl, naphthyl or phenyl-$C_1$-$C_4$-alkyl. The aromatic groups $R^1$, $R^2$, $R^3$ and $R^4$ can in turn be substituted by halogen and/or alkyl groups, preferably chlorine, bromine and/or $C_1$- to $C_4$-alkyl. Particularly preferred aryl radicals are cresyl, phenyl, xylenyl, propylphenyl or butylphenyl and the corresponding brominated and chlorinated derivatives thereof.

X in formula (V) preferably represents a mono- or poly-nuclear aromatic radical having from 6 to 30 carbon atoms. This radical is preferably derived from diphenols of formula (I).

The substituents n in formula (V), independently of one another, can be 0 or 1; n is preferably 1.

q represents integral values from 0 to 30, preferably from 0 to 20, particularly preferably from 0 to 10, in the case of mixtures average values of from 0.8 to 5.0, preferably from 1.0 to 3.0, more preferably from 1.05 to 2.00, and particularly preferably from 1.08 to 1.60.

X particularly preferably represents

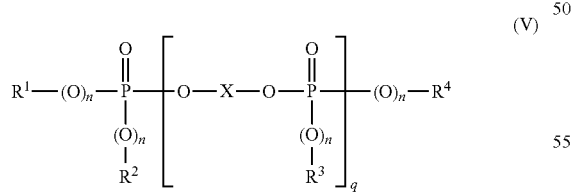

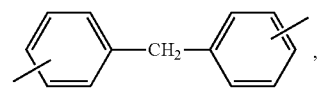

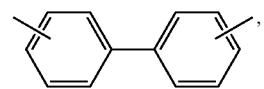

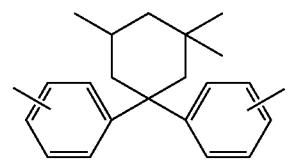

or chlorinated or brominated derivatives thereof. X is derived in particular from resorcinol, hydroquinone, bisphenol A or diphenylphenol. X is particularly preferably derived from bisphenol A.

Phosphorus compounds of formula (V) are in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged oligophosphate and bisphenol A-bridged oligophosphate. The use of oligomeric phosphoric acid esters of formula (V) that are derived from bisphenol A is particularly preferred.

Most preferred as component F is bisphenol A-based oligophosphate according to formula (Va):

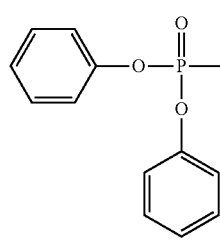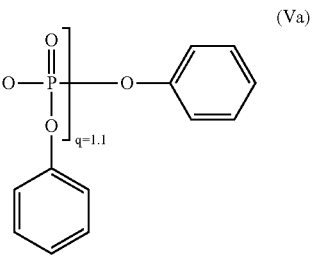

(Va)

The phosphorus compounds according to component F are known (see e.g. EP-A 0 363 608, EP-A 0 640 655) or can be prepared by known methods in an analogous manner (e.g. Ullmanns Enzyklopädie der technischen Chemie, Vol. 18, p. 301 ff. 1979; Houben-Weyl, Methoden der organischen Chemie, Vol. 12/1, p. 43; Beilstein Vol. 6, p. 177).

It is also possible to use as component F according to the invention mixtures of phosphates having different chemical structures and/or having the same chemical structure and different molecular weights.

Preferably, mixtures having the same structure and a different chain length are used, the indicated q value being the mean q value. The mean q value can be determined by determining the composition of the phosphorus compound (molecular weight distribution) by means of a suitable method (gas chromatography (GC), high pressure liquid chromatgraphy (HPLC), gel permeation chromatography (GPC)) and calculating the mean values for q therefrom.

Phosphonate amines and phosphazenes, as described in WO 00/00541 and WO 01/18105, can also be used as flameproofing agents.

The flameproofing agents can be used on their own or in an arbitrary mixture with one another or in admixture with other flameproofing agents.

Further Additives G

The composition can comprise further conventional polymer additives, such as flameproofing synergists, antidripping agents (for example compounds of the substance classes of the fluorinated polyolefins, of the silicones and aramid fibres), lubricants and mould-release agents (for example pentaerythritol tetrastearate), nucleating agents, stabilisers, antistatics (for example conductive blacks, carbon fibres, carbon nanotubes and also organic antistatics such as polyalkylene ethers, alkylsulfonates or polyamide-containing polymers), as well as colourings, pigments, fillers and reinforcing agents, in particular glass fibres, mineral reinforcing agents, carbon fibres.

There is used as antidripping agent in particular polytetrafluoroethylene (PTFE) or PTFE-containing compositions such as, for example, masterbatches of PTFE with styrene- or methyl methacrylate-containing polymers or copolymers. There are used as stabilisers preferably sterically hindered phenols and phosphites or mixtures thereof, such as, for example, Irganox© B900 (Ciba Speciality Chemicals). Pentaerythritol stearate is preferably used as mould-release agent.

Preparation and Testing of the Moulding Compositions

Below is described a suitable method for preparing a composition of the present invention.

In a twin-screw extruder (ZSK-25) (Werner and Pfleiderer), the substances listed in Table 1 are compounded and granulated at a speed of 225 rpm and a throughput of 20 kg/h, at a machine temperature of 260° C. The finished granules are processed in an injection moulding machine to the corresponding test specimens (melt temperature 240° C., tool temperature 80° C., flow front speed 240 mm/s).

The following methods were used to characterise the properties of the test specimens:

The notched impact strength was measured according to ISO 180/1A on a test rod measuring 80×10×4 mm injection molded from one side.

The impact strength was measured according to ISO 179/1eU on a test rod measuring 80×10×4 mm injection molded from one side.

The heat distortion resistance was measured according to DIN ISO 306 (Vicat softening temperature, process B with a load of 50 N and a rate of heating of 120 K/h) on a test rod measuring 80×10×4 mm injection molded from one side.

The scratch resistance was determined according to ASTM D-3363 (weight 750 g) as the pencil hardness. Pencils of hardness 3H, 2H, H, F, HB, B, 2B and 3B (decreasing hardness) are guided over the surface at a given pressure. The pencil hardness indicates the hardest pencil with which no scratches are discernible on the surface.

The stress cracking behaviour (ESC behaviour) is tested on rods measuring 80×10×4 min. The test medium used in each case is shown in Table 1 or Table 2. The test specimens are pre-stretched by means of a circular arc template (pre-stretch εx=2.4%) and stored at room temperature in the test medium. The stress cracking behaviour is evaluated by the crack formation ("CF") or no crack formation ("NCF") or fracture ("FR").

The behaviour in fire is measured according to UL 94V on rods measuring 127×12.7×1.5 mm.

The non-limiting examples which follow serve to explain the invention further.

EXAMPLES

Component A1

Linear polycarbonate based on bisphenol A, having a weight average molecular weight $\overline{M}_w$ of 27,500 g/mol (determined by GPC in dichloromethane with polycarbonate standard).

Component A2

Linear polycarbonate based on bisphenol A, having a weight-average molecular weight $\overline{M}_w$ of 19,500 g/mol (determined by GPC in dichloromethane with polycarbonate standard).

Component B1

ABS polymer, prepared by emulsion polymerisation of 43 wt. % (based on the ABS polymer) of a mixture of 27 wt. % acrylonitrile and 73 wt. % styrene in the presence of 57 wt. % (based on the ABS polymer) of a particulate crosslinked polybutadiene rubber (mean particle diameter $d_{50}$=0.35 μm).

Component B2

ABS polymer prepared by mass polymerisation of 82 wt. %, based on the ABS polymer, of a mixture of 24 wt. % acrylonitrile and 76 wt. % styrene in the presence of 18 wt. %, based on the ABS polymer, of a polybutadiene-styrene block copolymer rubber having a styrene content of 26 wt. %.

The weight-average molecular weight $M_w$ of the free SAN copolymer component in the ABS polymer is 80,000 g/mol (measured by GPC in THF with polystyrene standard). The gel content of the ABS polymer is 24 wt. % (measured in acetone).

Component C

Copolymer of 77 wt. % styrene and 23 wt. % acrylonitrile, having a weight-average molecular weight $M_w$ of 130,000 g/mol (determined by GPC in THF with polystyrene standard), prepared by the mass process.

Component D1

Polysiloxane composition containing 65% linear polydimethylsiloxane (D.1) having a molecular weight of 500,000 g/mol and 35 wt. % pyrogenic silicon dioxide (D.2) having a mean BET surface area of 250 m²/g.

Component D2

Polydimethylsiloxane, molecular weight 160,000 g/mol, linear, viscosity 500,000 mm²/s measured at 25° C.

Component E1

Calcined kaolin (aluminosilicate) without surface treatment, containing 52.4 wt. % silicon dioxide ($SiO_2$), 44.3 wt. % aluminium oxide ($Al_2O_3$), 0.5 wt. % iron oxide ($Fe_2O_3$), 2.5 wt. % $TiO_2$ (remainder water), having a $d_{(50)}$ (according to Sedigraph 5100) of 1.5 μm.

Component E2

Hollow ceramics spheres consisting of silicon-aluminium ceramics having an $Al_2O_3$ content of 12%. The hollow ceramics spheres have a specific density of 2.5 g/cm³ and possess an isostatic compressive strength of 420 MPa. The spheres have a mean diameter of 4 μm.

Component F

Bisphenol A-based oligophosphate (Reofoss BAPP)

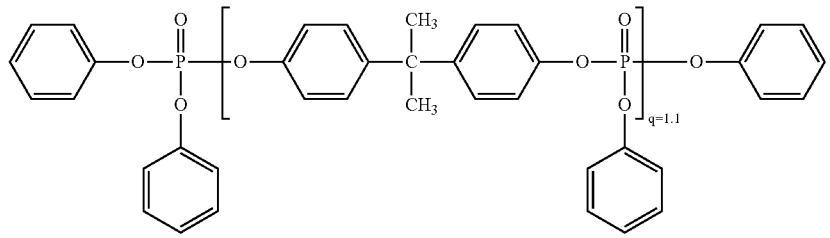

Component G

G1: Polytetrafluoroethylene powder, CFP 6000 N, Du Pont

G2: Pentaerythritol tetrastearate as lubricant/mould-release agent

G3: Phosphite stabiliser, Irganox® B 900, Ciba Speciality Chemicals

TABLE 1

Composition and properties of the PC/ABS moulding compositions containing specific siloxanes

| Composition [wt. %] | 1 (comp.) | 2 | 3 | 4 | 5 (comp.) | 6 (comp.) | 7 (comp.) |
|---|---|---|---|---|---|---|---|
| A1 | 38.5 | 38.5 | 38.5 | 38.5 | 38.5 | 38.5 | 38.5 |
| A2 | 33.4 | 33.4 | 33.4 | 33.4 | 33.4 | 33.4 | 33.4 |
| B1 | 4.9 | 4.9 | 4.9 | 4.9 | 4.9 | 4.9 | 4.9 |
| B2 | 5.6 | 5.6 | 5.6 | 5.6 | 5.6 | 5.6 | 5.6 |
| C | 7.1 | 6.1 | 4.1 | 2.1 | 6.1 | 4.1 | 2.1 |
| D1 | — | 1.0 | 3.0 | 5.0 | — | — | — |
| D2 | — | — | — | — | 1.0 | 3.0 | 5.0 |
| F | 9.7 | 9.7 | 9.7 | 9.7 | 9.7 | 9.7 | 9.7 |
| G1 | 0.4 | 0.4 | 0.4 | 0.4 | 0.4 | 0.4 | 0.4 |
| G2 | 0.1 | 0.1 | 0.1 | 0.1 | 0.1 | 0.1 | 0.1 |
| G3 | 0.4 | 0.4 | 0.4 | 0.4 | 0.4 | 0.4 | 0.4 |
| UL 94 V 1.5 mm | | | | | | | |
| Afterflame times [sec] | 108 | 99 | 79 | 34 | 95 | 90 | 83 |
| ak Notched impact strength [kJ/m²] | 10 | 12 | 13 | 15 | 11 | 12 | 13 |
| Vicat B 120 [° C.] | 109 | 110 | 109 | 108 | 107 | 105 | 102 |
| Scratch resistance (750 g) acc. to ASTM D-3363 | 2B | B | F | F | B | B | F |
| Stress cracking resistance | | | | | | | |
| 1) Engine oil [h:min] 2.4%/max 168 h | NCF 17:26 | NCF 21:09 | NCFl 79:04 | NCF 168:00 | NCF 13:16 | NCFl 28:26 | NCF 46:18 |
| 2) Toluene/isopropanol 5 min, breakage at outer fibre strain [%] | FR 2.0 | FR 2.2 | FR 2.4 | NCF 2.4 | FR 2.2 | FR 2.2 | FR 2.4 |

It is clear from Table 1 that compositions 2 to 4 according to the invention containing the specific polysiloxane preparation can advantageously lead to the desired improvements in properties. Compared with compositions containing polydimethylsiloxane (5 to 6), the moulding compositions according to the invention exhibit advantages in terms of flame resistance, notched impact strength and stress cracking resistance. Therefore in some embodiments, a polydimethylsiloxane is not included in component D.

TABLE 2

Composition and properties of PC/ABS moulding compositions containing specific siloxanes and hard inorganic constituents

| Composition [wt. %] | 8 | 9 | 10 (comp.) | 11 (comp.) | 12 | 13 | 14 (comp.) | 15 (comp.) |
|---|---|---|---|---|---|---|---|---|
| A1 | 68.1 | 68.1 | 68.1 | 68.1 | 64.6 | 64.6 | 64.6 | 64.6 |
| B1 | 7.5 | 7.5 | 7.5 | 7.5 | 7.5 | 7.5 | 7.5 | 7.5 |
| C | 5.0 | 5.0 | 5.0 | 5.0 | 2.5 | 2.5 | 2.5 | 2.5 |
| D1 | 1.0 | 1.0 | — | — | 2.0 | 2.0 | — | — |
| D2 | — | — | 1.0 | 1.0 | — | — | 2.0 | 2.0 |
| E1 | 5.0 | — | 5.0 | — | 10.0 | — | 10.0 | — |
| E2 | — | 5.0 | — | 5.0 | — | 10.0 | — | 10.0 |
| F | 12.5 | 12.5 | 12.5 | 12.5 | 12.5 | 12.5 | 12.5 | 12.5 |
| G1 | 0.4 | 0.4 | 0.4 | 0.4 | 0.4 | 0.4 | 0.4 | 0.4 |
| G2 | 0.1 | 0.1 | 0.1 | 0.1 | 0.1 | 0.1 | 0.1 | 0.1 |
| G3 | 0.4 | 0.4 | 0.4 | 0.4 | 0.4 | 0.4 | 0.4 | 0.4 |
| an Joint line [kJ/m$^2$] | 8.5 | 9.7 | 8.4 | 8.7 | 12.4 | 9.1 | 9.6 | 8.6 |
| ak Notched impact strength [kJ/m$^2$] | 13.6 | 11.4 | 12.2 | 10.9 | 15.2 | 10.4 | 14.2 | 9.7 |
| an Impact resistance [kJ/m$^2$] | 284 | 243 | 278 | 197 | 302 | 208 | 258 | 118 |
| Scratch resistance (750 g) acc. to ASTM D-3363 | F | H | F | H | F | 2H | F | 2H |
| Stress cracking resistance | | | | | | | | |
| 1) Rape oil [h:min] 2.4%/max 168 h | FR 1:39 | FR 1:22 | FR 1:20 | FR 0:58 | FR 1:54 | FR 1:39 | FR 1:30 | FR 1:22 |
| 2) Hand lotion [h:min] 2.4%/max 168 h | NCF 168:00 | NCF 129:21 | NCF 124:41 | NCF 120:05 | NCF 168:00 | NCF 119:25 | NCF 148:06 | NCF 113:40 |

The advantages of the PC/ABS moulding compositions containing specific polysiloxanes are even apparent when hard inorganic constituents are present in the PC/ABS blend as a further component. These additives are particularly important when a greater improvement in the scratch resistance is required. In this combination too, the compositions according to the invention lead to improvements in the field of mechanical properties (impact strength, notched impact strength, joint line strength) and stress cracking resistance.

The invention claimed is:

1. A composition comprising
    A) from 10 to 90 parts by weight aromatic polycarbonate and/or aromatic polyester carbonate,
    B) from 0.5 to 30 parts by weight rubber-modified graft polymer,
    C) from 0 to 40 parts by weight vinyl (co)polymer (C.1) and/or polyalkylene terephthalate (C.2),
    D) from 0.1 to 10.0 parts by weight polyorganosiloxane/filler composition comprising
    (D.1) at least one polyorganosiloxane comprising units of formula (IV):

$$R_rSiO_{(4-r)/2} \quad (IV)$$

wherein R is selected from the group consisting of vinyl, allyl, methallyl, 1-propenyl, 1-butenyl, 1-pentenyl, 5-hexenyl, butadienyl, hexadienyl, cyclopentenyl, cyclopentadienyl, cyclohexenyl, ethynyl, propargyl, 1-propynyl, methyl, 3-chloropropyl, 3,3,3-trifluoropropyl, perfluorohexylethyl, p-chlorophenyl and p-chlorobenzyl radicals, r is 0, 1, 2 or 3, and the average numerical value of r is from 1.9 to 2.1, (D.2) from 1 to 200 parts by weight, based on 100 parts by weight of the polyorganosiloxane (D.1), of a filler selected from the group consisting of pyrogenic and precipitated silicas having BET surface areas of at least 50 m$^2$/g (according to DIN 66131/2), and (D.3) from 0 to 20 parts by weight, based on 100 parts by weight of the polyorganosiloxane (D.1), of at least one additive for preparing a granulate, and (D.4) optionally at least one further auxiliary substance selected from the group consisting of processing aids, plasticisers, pigments and stabilisers, E) from 0 to 20.0 parts by weight of an inorganic compound having a Mohs hardness of at least 2.5, F) from 0 to 20 parts by weight of at least one phosphorus-containing flameproofing agent, G) from 0 to 10 parts by weight of at least one further additive, all parts by weight being normalised such that the sum of the parts by weight of all the components A+B+C+D+E+F+G in the composition is 100, and wherein there is an increase in stress cracking resistance of at least 59.4% in engine oil, or an increase in stress cracking resistance of at least 20.4% in rape oil, or an increase in stress cracking resistance of at least 5.1% in hand lotion, over a control composition without component D), or wherein the impact resistance of the composition is at least 208 kJ/m$^2$.

2. A composition according to claim 1, wherein component A is a mixture of a linear polycarbonate A1 comprising bisphenol A having a weight-average molecular weight $\overline{M}w$ of 27,500 g/mol and a linear polycarbonate A2 comprising bisphenol A having a weight-average molecular weight $\overline{M}w$ of 19,500 g/mol.

3. A composition according to claim 1, wherein the polyorganosiloxane of component D has a mean molecular weight $M_n$ of from 200,000 g/mol to 800,000 g/mol.

4. A composition according to claim 1, wherein the graft base of component B has a mean particle size ($d_{50}$ value) of from 0.05 to 10.00 µm.

5. A composition according to claim 1, wherein the graft base of component B is selected from the group consisting of diene rubbers, EP(D)M rubbers, acrylate, polyurethane, silicone, chloroprene and ethylene/vinyl acetate rubbers.

6. A composition according to claim 1, wherein the graft polymer (B) comprises
B.1) 43 wt.% of an emulsion polymer of 27 wt.% acrylonitrile and 73 wt.% styrene on
B.2) 57 wt.% of a particulate crosslinked polybutadiene rubber having a mean particle diameter $d_{50}$ of 0.35 µm.

7. A composition according to claim 1, wherein the phosphorus-containing flameproofing agent (F) is present and comprises a flameproofing agent of formula (V)

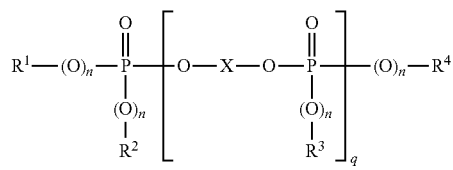

wherein
$R^1$, $R^2$, $R^3$ and $R^4$, independently of one another, represent in each case optionally halogenated $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl, and/or halogen each of the substituents n independently of the others represents 0 or 1,
q represents from 0.80 to 5.00 and
X represents a mono- or poly-nuclear aromatic radical having from 6 to 30 carbon atoms, or a linear or branched aliphatic radical having from 2 to 30 carbon atoms which can be OH-substituted and can contain up to 8 ether bonds.

8. A composition according to claim 1, wherein component G is present and comprises at least one additive selected from the group consisting of flameproofing synergists, antidripping agents, lubricants and mould-release agents, nucleating agents, stabilizers, antistatics, colorings, pigments, and fillers and reinforcing agents.

9. A composition according to claim 1 adapted in the production of injection-molded and/or thermoformed molded articles.

10. A composition according to claim 1, comprising
A) from 50-85 parts by wt. of aromatic polycarbonate and/or aromatic polyester carbonate,
B) from 1.0-25.0 parts by wt. of rubber-modified graft polymer,
C) from 1.0-30.0 parts by wt. of vinyl (co)polymer (C.1) and/or polyalkylene terephthalate (C.2),
D) from 0.3 to 8.0 parts by wt. polyorganosiloxane/filler composition,
E) from 1.0 to 15.0 parts by weight of an inorganic compound having a Mohs hardness of at least 2.5,
F) from 1.0-18.0 parts by wt. of at least one phosphorus-containing flameproofing agent,
G) from 0.5-8.0 parts by wt. of at least one further additive, wherein all the parts by weight stated are standardized such that the sum of the parts by weight of all the components A+B+C+D+E+F+G in the composition is 100.

11. A composition according to claim 1, comprising
A) from 60-75 parts by wt. of aromatic polycarbonate and/or aromatic polyester carbonate,
B) from 4.0-9.0 parts by wt. of rubber-modified graft polymer,
C) from 1.5-10 parts by wt. of vinyl (co)polymer (C.1) and/or polyalkylene terephthalate (C.2),
D) from 2.0 to 5.0 parts by weight polyorganosiloxane/filler composition,
E) from 3.0 to 12.0 parts by wt. of an inorganic compound having a mohs hardness of at least 2.5,
F) from 3.0-15.0 parts by wt. of at least one phosphorus-containing flameproofing agent,
G) from 1.0-6.0 parts by wt. of at least one further additive, wherein all the parts by weight stated are standardized such that the sum of the parts by weight of all the components A+B+C+D+E+F+G in the composition is 100.

12. A composition according to claim 1, wherein the inorganic compound of component E is present and is selected from the group consisting of silicates, aluminosilicates, carbides, nitrides and metal oxides.

13. A composition according to claim 12, wherein the metal oxides are selected from the group consisting of boron nitride, silicon carbide, tungsten carbide, boron carbide, cerium oxide, kaolin and aluminium oxide (corundum).

14. A composition according to claim 1, wherein component E is present and comprises hollow ceramic spheres having an $Al_2O_3$ content of from 5 to 25 wt. %.

15. A composition according to claim 14, wherein the hollow ceramic spheres have a compressive strength of from 50 to 700 MPa.

16. A composition according to claim 1, wherein component B is at least one graft polymer of
B.1 5 to 95 wt. % of at least one vinyl monomer on
B.2 95 to 5 wt. % of at least one graft base having glass transition temperature of <10° C., selected from the group consisting of diene rubbers, EP(D)M rubbers, acrylate, polyurethane, silicone, chloroprene, and ethylene/vinyl acetate rubbers.

17. A composition according to claim 16, wherein component B.1 is mixture of B.1.1 50 to 99 parts by wt. of at least one monomer selected from the group consisting of styrene, a-methylstyrene, p-methylstyrene, p-chlorostyrene, methyl methacrylate, and ethyl methacrylate, and B.1.2 1 to 50 parts by wt. of at least one monomer selected from the group consisting of acrylonitrile, methacrylnitrile, methyl methacrylate, n-butyl acrylate, tert-butyl acrylate, and maleic anhydride.

* * * * *